106. COMPOSITIONS, COATING OR PLASTIC.

90

185,554

EXAMINER

UNITED STATES PATENT OFFICE.

LLEWELLYN L. LEATHERS, OF OAKLAND, CALIFORNIA.

IMPROVEMENT IN COMPOUND FOR ARTIFICIAL STONE.

Specification forming part of Letters Patent No. 185,554, dated December 19, 1876; application filed November 28, 1876.

*To all whom it may concern:*

Be it known that I, LLEWELLYN L. LEATHERS, of Oakland, Alameda county, State of California, have invented an Improved Artificial Stone; and I do hereby declare the following description is sufficient to enable any person skilled in the art or science to which it most nearly appertains to make and use my said invention without further invention or experiment.

My invention relates to a novel combination of materials for compounding and producing an artificial stone of great and superior strength, durability, and hardness at a slight expense for material.

To make my artificial stone, I first make a chemical liquid or compound in the following manner: I first dissolve two and one-half pounds (apothecaries' weight) of borax in thirty quarts of water, then dissolve one and one-fourth pound (apothecaries' weight) of kaolin in thirty quarts of water, then dissolve two and one-half pounds (apothecaries' weight) of sulphate of barium in thirty quarts of water, and next dissolve one and one-fourth pound (apothecaries' weight) of sulphur in thirty quarts of alcohol. When the said ingredients are thoroughly and separately dissolved, as stated, I mix the several solutions or compounds by pouring them together into a vessel and thoroughly stirring. Having well mixed while dry four parts of clean silicious, sharp sand, or sand and gravel, and cement, I dilute three quarts of the chemical liquid or compound above described with thirty gallons of water and thoroughly mix, and then use a sufficient quantity of said last-mentioned diluted mixture to dampen said mixed sand and cement, so that it can be tamped in the usual way. I am thus able to produce an artificial stone of great durability and superior hardness.

N. B. The stone, after being manufactured as above stated, should be kept dampened with water for about four days, in which time it will petrify and harden fit for use.

Having thus described my invention, what I claim, and desire to secure by Letters Patent, is—

1. The process above described for making a chemical mixture or compound, diluted as and for the purposes set forth.

2. An artificial stone composed of sand and cement, moistened with a chemical mixture or compound, diluted, as above described, before tamping, substantially as and for the purposes above set forth.

LLEWELLYN LEVI LEATHERS.

Witnesses:
JOHN P. ROGERS,
THEO. BARKER.